(12) United States Patent
Dittel et al.

(10) Patent No.: US 9,634,301 B2
(45) Date of Patent: Apr. 25, 2017

(54) LITHIUM ION BATTERY CELL WITH SECONDARY SEAL

(71) Applicant: Johnson Controls Technology Company, Holland, MI (US)

(72) Inventors: Dennis L. Dittel, Milwaukee, WI (US); Matthew R. Tyler, Brown Deer, WI (US)

(73) Assignee: Johnson Controls Technology Company, Holland, MI (US)

( * ) Notice: Subject to any disclaimer, the term of this patent is extended or adjusted under 35 U.S.C. 154(b) by 41 days.

(21) Appl. No.: 14/634,635

(22) Filed: Feb. 27, 2015

(65) Prior Publication Data

US 2016/0197317 A1 Jul. 7, 2016

Related U.S. Application Data

(60) Provisional application No. 62/099,944, filed on Jan. 5, 2015.

(51) Int. Cl.
*H01M 2/08* (2006.01)
*H01M 2/30* (2006.01)
(Continued)

(52) U.S. Cl.
CPC ............ *H01M 2/08* (2013.01); *H01M 2/0237* (2013.01); *H01M 2/0262* (2013.01); *H01M 2/06* (2013.01);
(Continued)

(58) Field of Classification Search
CPC ........ H01M 2/08; H01M 2/0262; H01M 2/06; H01M 2/0237; H01M 10/0525; H01M 2220/20
See application file for complete search history.

(56) References Cited

U.S. PATENT DOCUMENTS 5,514,489 A 5/1996 Lenz et al.
7,695,856 B2 4/2010 Watanabe
(Continued)

FOREIGN PATENT DOCUMENTS

CA 2780615 12/2011
CN 1169241 6/2000
(Continued)

OTHER PUBLICATIONS

PCT/US2015/058083 International Search Report and Written Opinion dated Feb. 1, 2016.

*Primary Examiner* — Cynthia K Walls
(74) *Attorney, Agent, or Firm* — Fletcher Yoder, P.C.

(57) ABSTRACT

A lithium ion battery cell includes a prismatic casing enclosing active components of the lithium ion battery cell. The lithium ion battery cell also includes a terminal having a terminal post extending through an opening in the casing and electrically connected to the active components; a primary sealing component configured to seal a first portion of the terminal post against the casing; and a secondary seal disposed around a second portion of the terminal post and against the primary sealing component. The secondary seal is formed from a curable adhesive resin and is configured to resist egress of the electrolyte out of the lithium ion battery cell and is configured to resist ingress of moisture into the lithium ion battery cell.

23 Claims, 10 Drawing Sheets

(51) Int. Cl.
*H01M 10/0525* (2010.01)
*H01M 2/06* (2006.01)
*H01M 2/02* (2006.01)
*H01M 2/26* (2006.01)

(52) U.S. Cl.
CPC ....... *H01M 2/307* (2013.01); *H01M 10/0525* (2013.01); *H01M 2/028* (2013.01); *H01M 2/0277* (2013.01); *H01M 2/0285* (2013.01); *H01M 2/263* (2013.01); *H01M 2220/20* (2013.01); *Y02E 60/122* (2013.01); *Y02T 10/7011* (2013.01)

(56) References Cited

U.S. PATENT DOCUMENTS

| | | | |
|---|---|---|---|
| 8,859,138 B2 | 10/2014 | Fukuda et al. | |
| 2004/0258988 A1* | 12/2004 | Nielsen | H01G 9/10 429/181 |
| 2005/0112461 A1 | 5/2005 | Amine et al. | |
| 2005/0287434 A1* | 12/2005 | Kim | H01M 2/06 429/161 |
| 2006/0115727 A1* | 6/2006 | Kim | H01M 2/08 429/181 |
| 2009/0186269 A1* | 7/2009 | Kim | H01M 2/043 429/179 |
| 2010/0003584 A1* | 1/2010 | Dougherty | H01M 2/021 429/72 |
| 2010/0129709 A1* | 5/2010 | Matsubara | H01M 2/024 429/179 |
| 2010/0216016 A1 | 8/2010 | Seino et al. | |
| 2011/0072648 A1 | 3/2011 | Yamauchi | |
| 2011/0117426 A1* | 5/2011 | Choi | H01M 2/021 429/178 |
| 2012/0015242 A1 | 1/2012 | Gow et al. | |
| 2012/0082888 A1 | 4/2012 | Hashimoto et al. | |
| 2012/0171547 A1 | 7/2012 | Pennaz et al. | |
| 2012/0208051 A1 | 8/2012 | Tsukiji et al. | |
| 2012/0234387 A1 | 9/2012 | Sawada et al. | |
| 2013/0029213 A1 | 1/2013 | Cain et al. | |
| 2013/0089809 A1 | 4/2013 | Farrington | |
| 2013/0095354 A1 | 4/2013 | Bergmann et al. | |
| 2013/0196197 A1 | 8/2013 | Tyler et al. | |

FOREIGN PATENT DOCUMENTS

| | | |
|---|---|---|
| CN | 102144315 | 8/2011 |
| CN | 203466232 | 3/2014 |
| EP | 1062705 | 12/2000 |
| EP | 1193779 | 4/2002 |
| EP | 2810319 | 12/2014 |
| JP | 2005093200 | 4/2005 |
| JP | 2010177089 | 8/2010 |

* cited by examiner

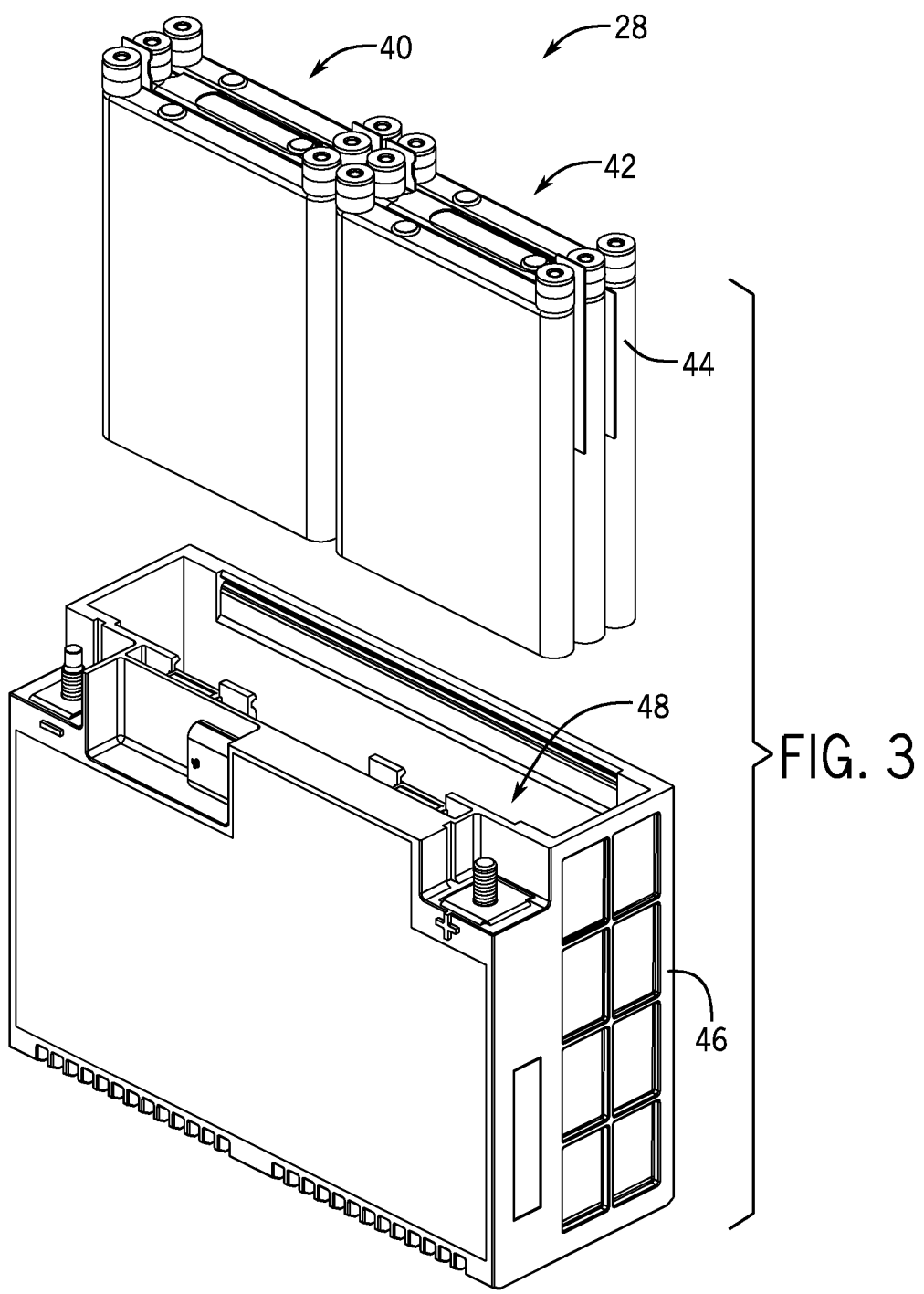

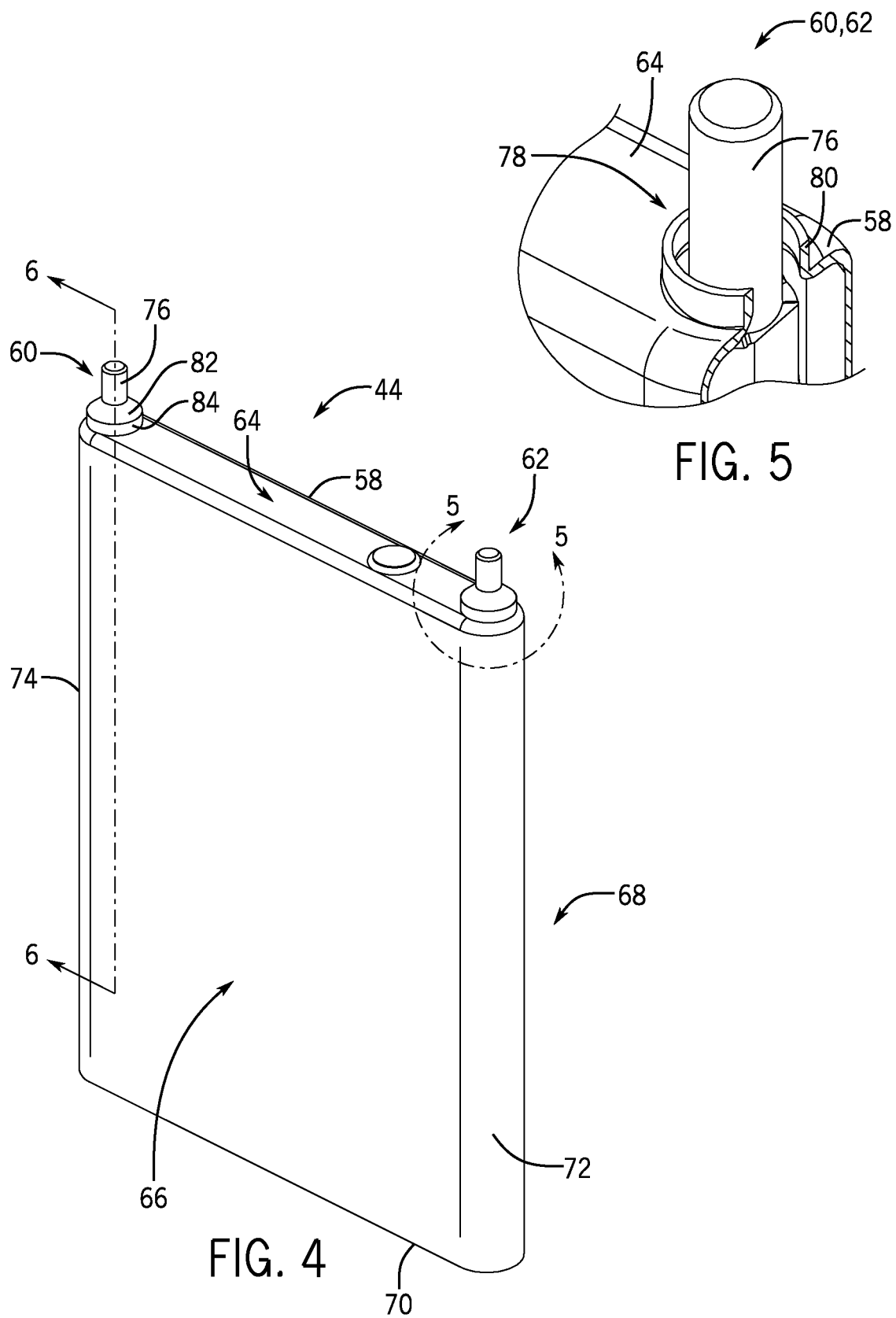

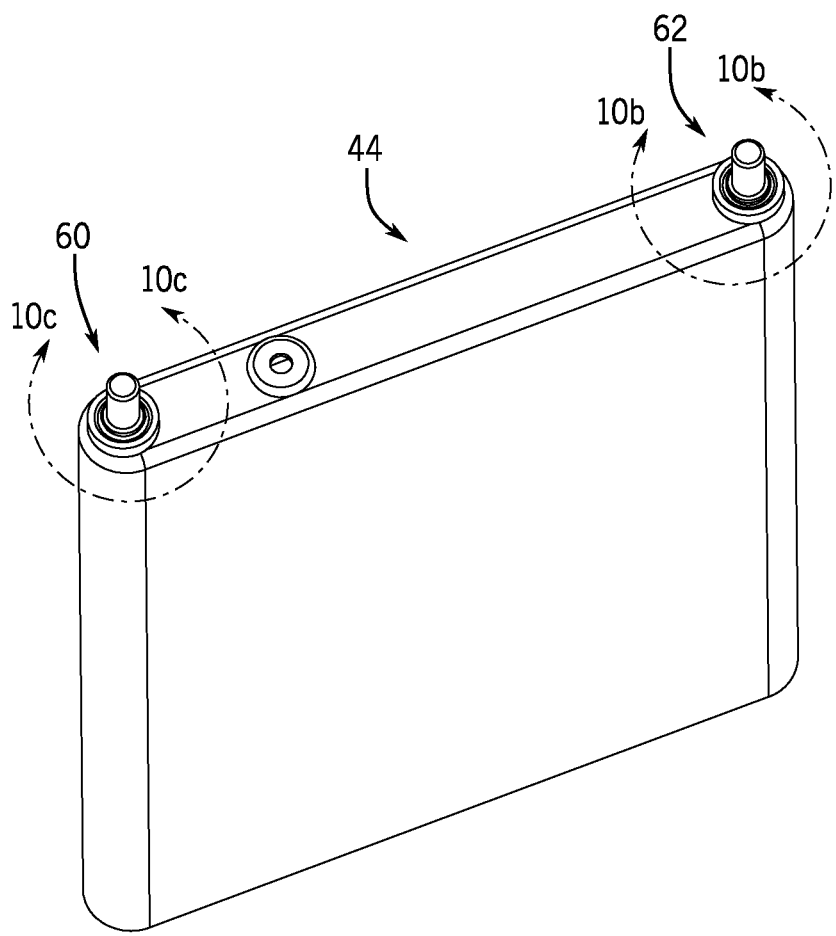
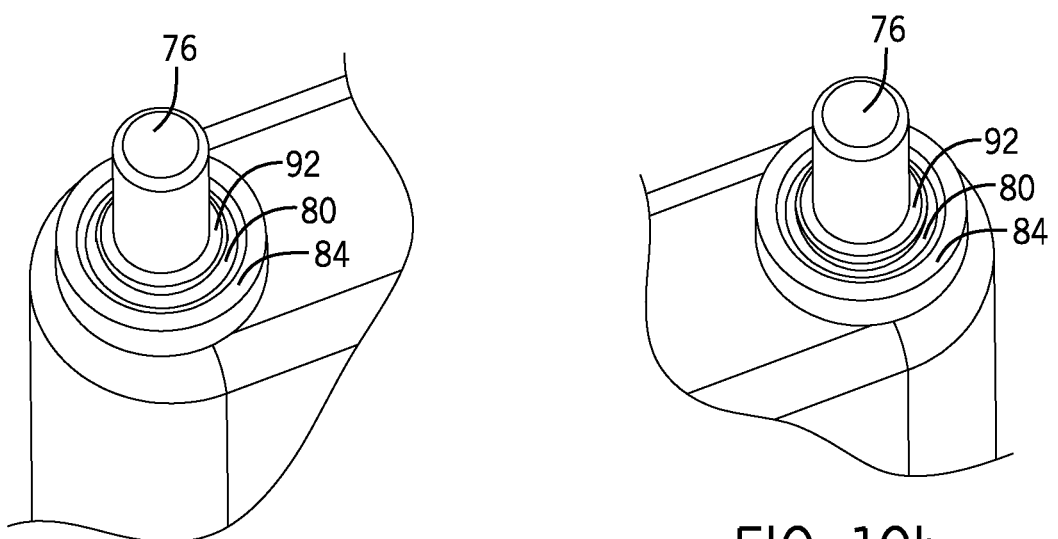

LITHIUM ION BATTERY CELL WITH SECONDARY SEAL

CROSS REFERENCE TO RELATED APPLICATION

This application claims priority from and the benefit of U.S. Provisional Application Ser. No. 62/099,944, entitled "Secondary Sealant for Battery Cell Terminals", filed Jan. 5, 2015, which is hereby incorporated by reference in its entirety for all purposes.

BACKGROUND

The present disclosure relates generally to the field of lithium-ion batteries and battery modules. More specifically, the present disclosure relates to battery cells that may be used in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As xEV technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance of such batteries and to reduce the cost associated with the battery systems. Of the many considerations associated with the performance and costs of such battery systems, it is presently recognized that it may be desirable to reduce the occurrence of electrolyte leakage out of battery cells incorporated into the battery systems, which may improve the lifetime of such battery cells and improve the yield of usable battery cells obtained from their associated manufacturing processes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a lithium ion battery module includes a lithium ion battery cell disposed within a housing of the battery module. The lithium ion battery cell includes a casing enclosing active components of the lithium ion battery cell, the active components including an electrolyte and an electrode assembly in contact with the electrolyte; a terminal electrically connected to the electrode assembly, wherein the terminal includes an electrical contact extending through an opening in the casing; a primary sealing component disposed against the electrical contact to seal the electrical contact against the casing; and a secondary seal disposed around the electrical contact and against the primary sealing component. The secondary seal is formed from a curable adhesive resin and is configured to resist egress of the electrolyte out of the lithium ion battery cell.

In another embodiment, a lithium ion battery cell includes a prismatic casing enclosing active components of the lithium ion battery cell. The lithium ion battery cell also includes a terminal having a terminal post extending through an opening in the casing and electrically connected to the active components; a primary sealing component configured to seal a first portion of the terminal post against the casing; and a secondary seal disposed around a second portion of the terminal post and against the primary sealing component. The secondary seal is formed from a curable adhesive resin and is configured to resist egress of the electrolyte out of the lithium ion battery cell and is configured to resist ingress of moisture into the lithium ion battery cell.

In another embodiment, a double-sealed lithium ion battery cell is produced by a process that includes disposing a secondary sealant having a curable adhesive resin on a sealed terminal region of a prismatic lithium ion battery cell such that the secondary sealant covers a first portion of an electrical contact of the terminal region and a primary seal component disposed against a second portion of the electrical contact. The process also includes curing the curable adhesive resin to form a secondary seal that covers the first portion of the electrical contact and the primary seal component.

DRAWINGS

Various aspects of this disclosure may be better understood upon reading the following detailed description and upon reference to the drawings in which:

FIG. 3 is an exploded perspective view of the lithium ion battery module of FIG. 2 having a plurality of battery cells, in accordance with an embodiment of the present approach;

FIG. 4 is a perspective view of an embodiment of one of the battery cells of FIG. 3, in accordance with an embodiment of the present approach;

FIG. 5 is an expanded and partial cutaway view of the battery cell of FIG. 4 taken within section 5-5, in accordance with an embodiment of the present approach;

FIG. 10a is a perspective view of a battery cell before introduction of a secondary seal, in accordance with an embodiment of the present approach;

FIG. 10b is an expanded view of one of the primarily sealed terminals of the battery cell of FIG. 10a, in accordance with an embodiment of the present approach;

FIG. 10c is an expanded view of another one of the primarily sealed terminals of the battery cell of FIG. 10a, in accordance with an embodiment of the present approach;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to a number of different types of xEVs as well as other energy storage applications (e.g., electrical grid power storage systems). Such battery systems may include one or more battery modules, each battery module having a number of battery cells (e.g., lithium ion cells) arranged to provide particular voltages and/or currents useful to power, for example, one or more components of an xEV. Generally, the battery cells include electrochemical materials (e.g., electrolytes, electrode active materials), which are responsible for much of the electrical activity of the battery cell. The electrochemical materials are housed within, and supported by, certain mechanical features of the cell, such has a housing of the battery cell, a current collector of the battery cell, and so forth.

During production, the combination of these mechanical and electrochemical features of the battery cell may result in one or more regions of the battery cell that are sealed using dissimilar materials. For example, the terminals of the battery cells, which include some portions that are electrically coupled to the electrochemical components internal the battery cell but also include other portions that are exposed to the environment, may be sealed against the battery cell housing using an electrically insulative, compliant seal. The seal will generally include a dissimilar material compared to the terminal and housing. Unfortunately, the meeting of these dissimilar materials can create regions that are, in some situations, insufficient to retain all the electrochemical materials within the battery cell. This loss of material can reduce the performance of the battery cell and can also reduce the performance of any electrical components connected to the battery cell (e.g., other battery cells, a battery module having the battery cell).

Figure 1:
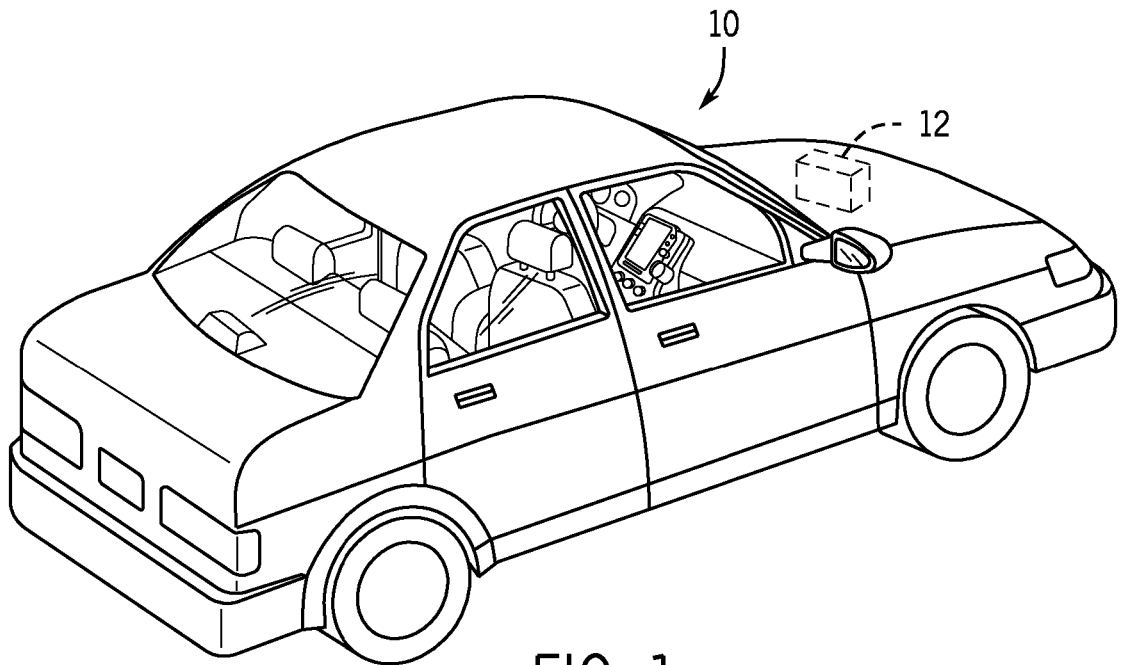
FIG. 1 is a perspective view of an xEV having a battery system configured in accordance with present embodiments to provide power for various components of the xEV, in accordance with an aspect of the present disclosure.
Figure 2:
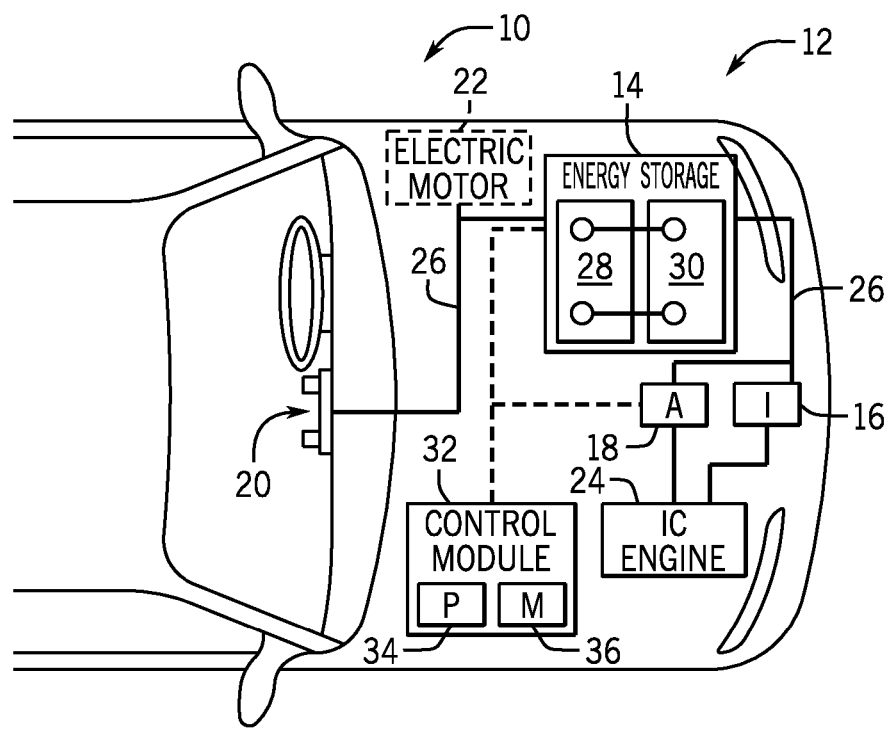
FIG. 2 is a cutaway schematic view of an embodiment of the xEV having a start-stop system that utilizes the battery system of FIG. 1, the battery system having a lithium ion battery module, in accordance with an aspect of the present disclosure.

It is now recognized that a sealant around a terminal post (e.g., an electrical contact) of a battery cell may be used to enable enhanced sealing of the battery cell. Indeed, it may be desirable to seal battery cells (e.g., lithium ion battery cells) with a secondary sealant for a number of reasons, including maintaining a relatively constant amount of electrolyte within the battery cell, while also blocking ingress of water into the battery cell. By blocking the egress of electrolyte out of the battery cell and blocking the ingress of water into the battery cell, a consistent electrical performance of the battery cell may be maintained over a longer period of time. In the context of battery modules having such battery cells, the battery modules may have increased reliability and may provide steady performance over their usable life. From a manufacturing standpoint, the secondary sealant of the battery cells may enable a higher battery cell yield during manufacture (e.g., a higher yield of usable battery cells), which may reduce the cost associated with their production. On the consumer end, such reduced costs may enable a lower cost associated with the purchase and maintenance of such battery cells and battery modules incorporating the cells. FIGS. 1 and 2 depict example embodiments of systems that incorporate battery cells having the secondary sealant of the present disclosure.

The present embodiments may be further appreciated with reference to FIG. 1, which is a perspective view of an embodiment of a vehicle (e.g., xEV) 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

It is now recognized that it is desirable for a non-traditional battery system 12 (e.g., a lithium ion car battery) to be largely compatible with traditional vehicle designs. In this respect, present embodiments include various types of battery modules for xEVs and systems that include xEVs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each includes one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or more processors 34 and one or more memory 36. More specifically, the one or more processor 34 may include one or more application specific integrated circuits (ASICs), one or more field programmable gate arrays (FPGAs), one or more general purpose processors, or any combination thereof. Additionally, the one or more memory 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

As set forth above, certain embodiments of lithium ion battery modules in accordance with the present disclosure may include a plurality of battery cells, where each battery cell includes cell terminals. An example embodiment of the lithium ion battery module 28 is shown in FIG. 3, with certain features of the battery module 28 being removed for clarity. A first battery cell stack 40 and a second battery cell stack 42, which each include a plurality of battery cells 44, are shown as being removed from a module housing 46. Again, the battery cells 44 include a secondary sealant in accordance with aspects of the present disclosure. When the module 28 is assembled, the battery cells 44 are positioned within a cell receptacle region 48 of the module housing 46 in a specific orientation. In the embodiment of FIG. 3, the battery cells 44 are inserted "bottom first" into the cell receptacle region 48. However, the presently disclosed battery cells may be positioned in any orientation, and in any arrangement. Thus, the positioning of the battery cells in the module housing is not particularly limited.

Certain features, as well as the orientation of the battery cells 44, may be further appreciated with reference to FIG. 4, which is a perspective view of one of the battery cells 44. As depicted, each battery cell 44 of the first and second battery cell stacks 40, 42 will generally include a casing 58, with a first cell terminal 60 and a second cell terminal 62 (e.g., positive and negative terminals, respectively) protruding through the casing 58. The casing (housing) 58 of the battery cell 44, which houses the active electrochemical elements of the cell 44, may be polymeric, metallic, composite, or any other suitable material. In a prismatic cell configuration, as shown in FIGS. 3-9, the casing 58 of the battery cells 44 includes a top 64 where at least one terminal is located (the illustrated embodiment has the first cell terminal 60 and the second cell terminal 62).

The illustrated battery cell 44 of FIG. 4 also includes a first face 66 and a second face 68 in an opposed relationship. The first and second faces 66, 68 correspond to the broadest part of a casing (housing) of the battery cells 44. A bottom 70 of the battery cell 44 is substantially opposite the top 64. The first and second faces 66, 68 extend between the top 64 and bottom 70, and are coupled by a first side 72 and second side 74. The first and second sides 72, 74 may be straight, rounded, or any other suitable geometry.

The illustrated embodiment of the battery cell 44 includes a terminal post 76 at each of the terminals 60, 62. The terminal posts 76 are configured to act as an electrical contact for the battery cells 44 to enable electrical interconnection with other battery cells and/or other features of the module 28, or to some other electrical load. As shown in the partial expanded and cross-sectional view of FIG. 5, the terminal post 76 is disposed in a terminal region 78 of the battery cell 44. The terminal region 78 is illustrated as being defined by an opening or orifice in the top 64 of the battery cell 44 (the casing of the cell 44). While the opening or orifice may have another configuration in other embodiments, the illustrated embodiment of the terminal region 78 is defined by a protrusion (e.g., a collar), depicted as a cylindrical extension 80 protruding from the top 64 of the cell 44. The cylindrical extension 80, which is hollow, extends away from the top 64 and is substantially co-axial with the terminal post 76. In other words, the terminal post 76 is disposed within an annulus or annular region formed by the cylindrical extension 80. The protrusion (e.g., cylindrical extension 80) defines an annular region that is substantially parallel (e.g., co-axial) with the electrical contact (e.g., terminal post 76).

Returning to FIG. 4, the terminals 60, 62 are also depicted as including a secondary seal 82 disposed over the cylindrical extension 80 and over a compressive seal 84 (the secondary seal 82 and the compressive seal 84 are removed from FIG. 5 for discussion purposes). Indeed, as discussed in further detail below, the secondary seal 82 may be disposed over the cylindrical extension 80, the compressive seal 84, and/or other sealing features disposed at the terminal region 78. In accordance with present embodiments, the secondary seal 82 is configured to resist the egress of electrolyte 86 out of the casing 58 while also resisting the ingress of certain materials (e.g., water) into the lithium ion battery cell 44 (e.g., into the casing 58). The secondary seal 82 is disposed against the compressive seal 84 such that the compressive seal 84 is positioned between the secondary seal 82 and the top 64 of the battery cell 44.

Figure 6:
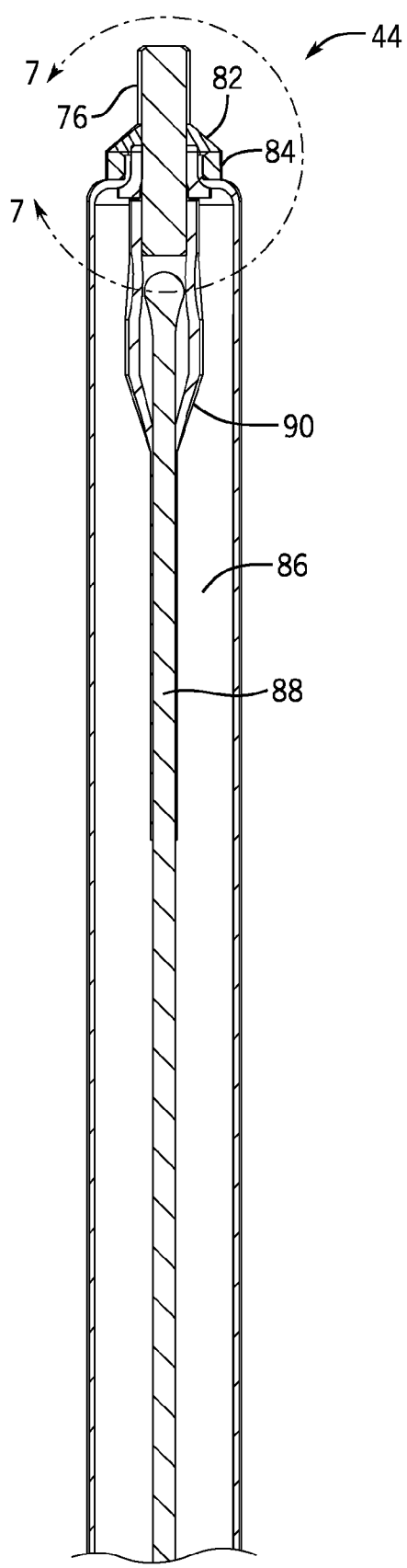
FIG. 6 is cross-sectional view of the battery cell of FIG. 4 taken within section 6-6 and illustrating active internal components of the battery cell, in accordance with an embodiment of the present approach.

As shown in the cross-sectional view of FIG. 6, active components of the battery cell 44 include the electrolyte 86, which may include additives, a source of lithium ions for ion conduction, non-aqueous solvents, and so forth. The active components also include electrode assemblies 88, which may be present as a "jelly roll," as a series of stacked coated foil plates, or the like. Generally, the electrode assemblies 88 will include a metallic conductor (e.g., aluminum foil, copper foil) coated with an electrode active material, which may include a lithium ion electrode active material species for the cathode and may include a lithium ion electrode active material and/or carbon-based electrode active material at the anode. As also shown in FIG. 6, the electrode assemblies 88 are electrically connected to the terminal post 76 via a current collector 90. The secondary seal 82 may enable enhanced stability of operation for the electrode assemblies 88 by preventing egress of the electrolyte 86 out of the cell 44 and enabling a stable concentration of electrolyte components within the cell 44.

Figure 7:
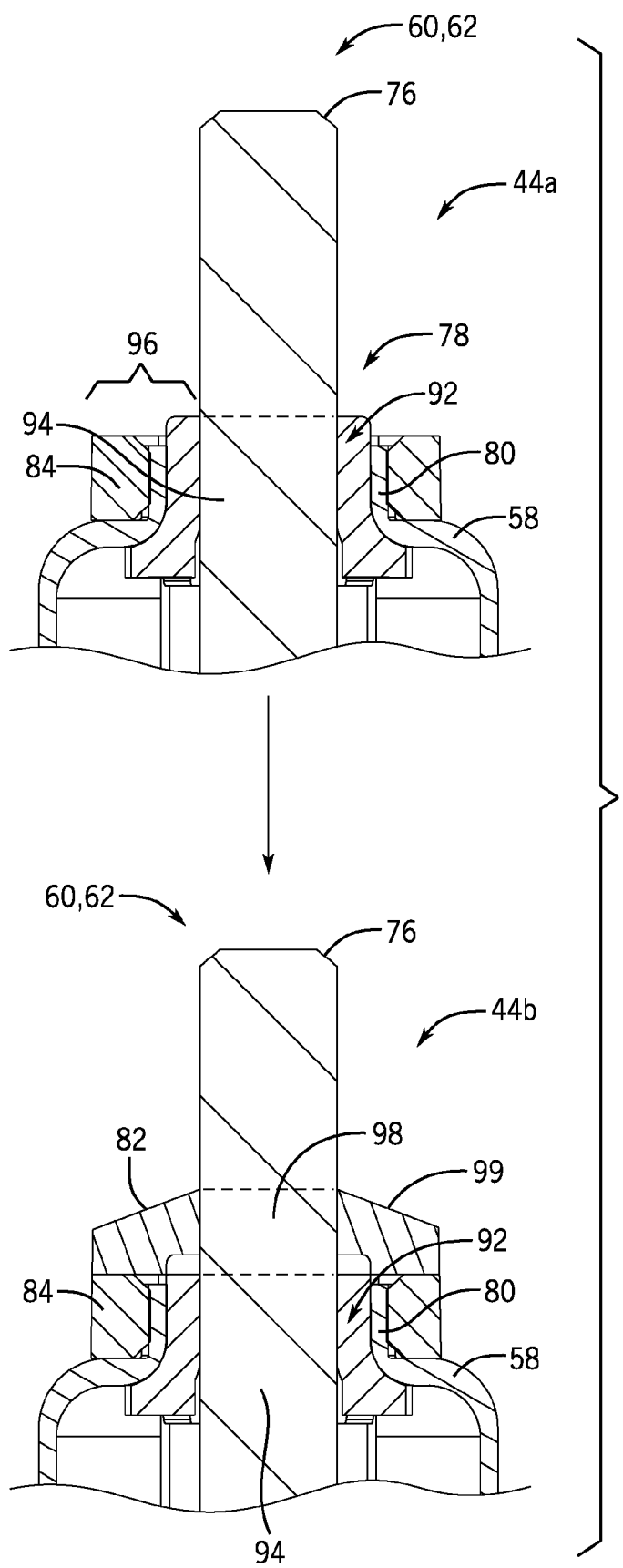
FIG. 7 is an expanded view of FIG. 6, taken within section 7-7 and further illustrating various seals disposed at a terminal region of the battery cell of FIG. 4, in accordance with an embodiment of the present approach.

The terminal region 78 of the battery cell 44 may be further appreciated with reference to FIG. 7, which schematically depicts an embodiment of the battery cell 44 before and after introduction of the secondary seal 82. As shown, certain sealing and/or insulating features may be disposed between the cylindrical extension 80 and the terminal post 76 to prevent the casing 58 of the cell 44 from becoming charged (e.g., in embodiments where the casing 58 is metallic).

More specifically, the battery cell 44 includes the terminal post 76 (electrical contact) extending from an interior of the battery cell casing 58, through the casing 58 of at the terminal region 78, and the terminal post 76 and is separated from the casing 58 (e.g., the cylindrical extension 80) by an primary seal 92. The primary seal 92 is generally electrically insulative with respect to the terminal post 76, and in embodiments where the casing 58 is metallic, the primary seal 92 may be configured to prevent a short between the terminal post 76 and the casing 58. In other embodiments, as set forth below (e.g., when the casing 58 is polymeric), such insulation may not be necessary.

The compressive seal 84 is situated around the cylindrical extension 80 and is external to the cell casing 58. The compressive seal 84 (e.g., primary external seal) is in direct abutment with the cylindrical extension 80. The compressive seal 84 is configured to provide a compressive force to the cylindrical extension 80 (e.g., via a press fit, crimping), and is also configured to block the egress of materials out of the cell 44, and the ingress of materials (e.g., water) into the cell 44. The compressive seal 84 may, in its most general sense, be configured to compress the primary seal 92 against a first portion 94 of the terminal post 76 (the electrical contact). Therefore, the lithium ion battery cell 44 may be considered to include a plurality of primary sealing components 96, which may include the compressive seal 84, the primary seal 92, and may also include a protrusion of the casing 58 (e.g., the cylindrical extension 80). The primary sealing components 96 may, in other embodiments, only include some of these, such as the primary seal 92, or in still further embodiments, include other subsets, such as the primary seal 92 and the protrusion from the casing 58, but not the compressive seal 84.

The compressive seal 84 may be made from any suitable material that is capable of providing a compressive, inwardly force to the cylindrical extension 80 so as to compress the cylindrical extension 80 and the primary seal 92 against the terminal post 76. In other words, the compressive seal 84 provides a compressive force such that the cylindrical extension 80 and the primary seal 92 are urged inwardly toward the electrical contact (the terminal post 76). By way of non-limiting example, the compressive seal 84 may be made from or include a metal material, a polymeric (e.g., elastomeric) material, a ceramic material, and so forth. In certain embodiments, it may be desirable for the compressive seal 84 to be made from a metallic material that is capable of being deformed into a substantially permanent compressed configuration via, for example, a press-fitting operation. In one embodiment, the compressive seal 84 may be considered to include a metal ring disposed around the protrusion (e.g., cylindrical extension 80) and/or the primary seal 92. The metal ring may be deformed into a compressed state to provide the compressive force.

While the primary sealing components 96 may provide sufficient sealing in certain configurations, it is now recognized that the secondary seal 82 may be desirable to provide additional sealing, several benefits of which are described in further detail below. As shown in FIG. 7, upon application of a secondary sealant (which may include a curable resin, among other components), the secondary seal 82 may be located adjacent to the compressive seal 84, such as above the compressive seal 84 (e.g., using the direction of the terminal post 76 relative to the casing 58 of the battery cell 44 as a reference). In other words, the secondary seal 82 (or at least portions thereof) may be disposed above the compressive seal 84, the cylindrical extension 80, and the primary seal 92. In addition, as shown, the secondary seal 82 may be in direct contact with the terminal post 76 (or other electrical contact of the cell 44). In other words, the secondary seal 82 is disposed against the primary seal 92 and around a second portion 98 of the electrical contact (the terminal post 76). As depicted, the second portion 98 is further away from the active components of the lithium ion battery cell 44 than the first portion 94. The secondary seal 82 is also shown as extending away (radially away) from the second portion 98 of the terminal post 76 and to the compressive seal 84 (e.g., to an outer edge of the compressive seal 84) such that the compressive seal 84 and the secondary seal 82 are in an overlapping relationship in a longitudinal direction of the lithium ion battery cell 44. In accordance with this positional relationship, the compressive seal 84 is disposed between the casing 58 and the secondary seal 82. Also, the secondary seal 82 is entirely external to the casing 58.

In this regard, and in accordance with the sealing configuration set forth in FIGS. 4, 6, and 7, the secondary seal 82 is capable of and configured to resist egress of electrolyte out of the battery cell 44, even if the primary seal 92, the compressive seal 84, or both, fail to retain the electrolyte (e.g., due to manufacturing defects or mechanical failure from force application). On the other hand, the secondary seal 82 may also provide enhanced protection and blocking of the ingress of water into the battery cell 44 by serving as the outermost feature that blocks moisture. This may enable enhanced stability for the active components internal to the casing 58 (e.g., the electrolyte 86 and the electrode assemblies 88).

In accordance with present embodiments, the secondary seal 82 may be disposed fully or partially around the compressive seal 84 (e.g., using the position of the compressive seal 84 relative to the terminal post 76 as a reference), or may be both above and around the compressive seal 84, either partially or totally. In addition, the secondary seal 82 may be partially or totally above and/or around the cylindrical extension 80. Further still, the secondary seal 82 may be partially or totally around the primary seal 92, or may be partially or totally above the entirety of the primary seal 92, or any combination of these. Indeed, in one embodiment, the secondary seal 82 may be positioned relative to the primary seal 92 in such a way to block the primary seal 92 from being subjected to external materials (e.g., blocking contact with moisture). Further, the secondary seal 82 may be positioned relative to the primary seal 92 such that substantially any mechanical failure of the primary seal 92 is compensated for by the secondary seal 82 in a way that enables the electrolyte 86 to be retained within the cell 44.

The secondary seal 82 may also include a taper 99, as illustrated. The taper 99 may vary, but is generally configured such that a thickness of the secondary seal 82 decreases in a radially outward direction from the terminal post 76 (electrical contact). This configuration of the taper 99 may be desirable to direct materials (e.g., water, debris, liquids) away from the terminal post 76 and away from the locations where the secondary seal 82 and the primary seal 92 meet the terminal post 76. Indeed, the greater thickness of the secondary seal 82 where the secondary seal 82 meets the terminal post 76 may also enhance its ability to resist the egress of electrolyte out of the battery cell 44 at locations where the battery cell 44 is most susceptible to leakage.

Because the secondary seal 82 may contact both the terminal post 76 and the cell casing 58 (e.g., at the cylindrical extension 80), it may be desirable for the secondary seal 82, and in some embodiments the material used to produce the secondary seal 82 (referred to as the secondary sealant), to be electrically insulating. For example, the secondary seal 82 may have a resistance that does not allow it to conduct appreciable electrical current at operating voltages of the battery module 28. In other words, the secondary seal 82 is configured to act as a dielectric material at operating voltages of the battery module 28. For instance, the secondary seal 82 may maintain an electrical resistance of between 1000 MOhms and 20000 MOhms at a voltage of between 2V and 150V. However, this is but one example, and there may be other ranges of electrical resistance and other voltages for which the use of the secondary seal 82 may be useful.

A secondary sealant used in accordance with present embodiments may be any material that results in the secondary seal 82 having a suitable electrical resistance (e.g., as set forth above) and a suitable sealing ability to resist or block the egress of electrolyte 86 out of the battery cell 44. By way of non-limiting example, the secondary sealant may include a number of different components, including a curable resin (e.g., a curable adhesive resin) that includes polymeric material, oligomeric material, monomeric material, or a combination thereof. The resin may be curable using, for example, light (e.g., ultraviolet (UV) light), heat, or any other suitable external stimulus. However, it may be desirable for the curable resin to be UV-curable to enable the secondary sealant to be cured without the application of heat or other external stimuli that could deleteriously affect the battery cell 44. For instance, it may be desirable to avoid heating the battery cell 44, as this may heat the electrolyte 86 within the cell 44 and/or heat the active materials of the cell 44 and thereby possibly reduce the cell performance (e.g., due to electrolyte volatilization and/or electrode delamination).

The secondary sealant, including the curable resin, may have a chemistry that is both compatible with the materials of the battery cell 44 (e.g., external materials such as the casing 58, the compressive and insulating seals 84, 92, and terminal post 76) and is also able to adhere to one or more external surfaces of the battery cell 44, such as the surfaces of the casing 58, seals 84, 92, and terminal post 76. For example, the positive and negative terminal posts may be the same or different metallic materials (e.g., copper and aluminum), and the curable resin (as well as its cured form) should be compatible with the terminal post materials. Furthermore, in one embodiment, the secondary sealant used to produce the secondary seal 82 may include a resin that is capable of interacting with the primary seal 92 on a molecular level, which may enable enhanced sealing. For instance, the curable resin of the secondary sealant may be capable of flowing into the primary seal 92 to a certain extent, and when the resin of the secondary sealant is cured, the secondary sealant may reinforce the primary seal 92 by incorporating extensions of the secondary seal 82 into the primary seal 92. However, in other embodiments, the secondary sealant may be selected to be a material that does not undergo such an interaction, for example to avoid early degradation of the primary seal 92.

By way of non-limiting example, the curable resin of the secondary sealant may be an epoxy resin, an acrylate resin, or any other suitable adhesive resin. In accordance with an aspect of the present disclosure, a UV curable epoxy or acrylated urethane resin may be selected based on its ability to seal the battery cell terminals (e.g., first and second battery cell terminals 60, 62 in the manner described herein, as opposed to being selected simply based on its adhesive characteristics. As one example, the UV curable resin may be SPEEDMASK® 706 or SPEEDMASK® 729 UV curable acrylate resin, available from Dymax Corporation of Torrington, Conn., USA. As another example, the UV curable resin may be OPTIX® UV curable epoxy adhesive available from Resin Design, LLC of Woburn, Mass., USA.

The secondary sealant, including the curable resin, may include or be mixed with a variety of additional components. For example, the secondary sealant may also include a filler material to provide additional chemical resistance, mechanical strength, electrical resistance, thermal conductivity, or any combination thereof, to the secondary seal 92. For example, the filler may have any suitable geometry, such as granular, tubular, fibrous, or the like, and may include, by way of non-limiting example, a ceramic material, a polymer material, a glass material, or any other suitable filler material.

Additives may also be incorporated into the secondary sealant. For example, the curable resin may be mixed with pigments, chemical resistance additives, and so forth, to produce the secondary sealant. Indeed, it is now recognized that it may be desirable for the curable resin to be mixed with a pigment to facilitate automated manufacturing. For example, during certain automated manufacturing processes, an optical system may track relative positions of certain battery cell features, positions of the battery cell relative to other components (e.g., other battery cells, the module housing), and certain welds of the battery cell. By incorporating a pigment into an otherwise clear or relatively un-contrasted version of the secondary sealant, such optical systems may be able to track the secondary seal 82 (including during application of the secondary sealant), and may also enable an automated system to perform various quality checks and measurements both during and after its application. Indeed, in certain embodiments, the secondary seal 82 may include a pigment that enables it to be contrasted against the other components of the battery cell 44 (e.g., the compressive sealing components) for detection by optical-based automated detection systems.

Example specifications for the UV curable resin are provided herein, and resins meeting such example specifications may be useful as secondary sealants in accordance with the present disclosure. However, these specifications are examples only, and are not exhaustive. Indeed, there may be additional considerations, such as chemical resistance, that are not specified herein but may be important considerations when selecting a material to act as a secondary sealant. Furthermore, the resin may have certain properties that change after cure (after formation of the secondary seal 82) and, as appropriate, these properties are denoted below as being for the "uncured resin" and "cured resin."

The viscosity of the curable resin may be an important property to enable controlled application of the resin to the battery cell 44 before the resin is cured and hardened. Indeed, if the viscosity is too low, the resin may not remain in an appropriate position during application and the resin may be wasted. On the other hand, if the viscosity is too high, then the resin may not flow properly or allow clean application to the battery cell 44. By way of non-limiting example, the viscosity of the uncured resin may be measured according to ASTM D1084, and may have a viscosity of between approximately 1000 centiPoise and approximately 4000 centiPoise, such as between approximately 1500 centiPoise and approximately 3500 centiPoise, or between approximately 1800 centiPoise and approximately 2800 centiPoise.

Once cured, the resin may have a hardness sufficient to withstand the physical stresses that can be placed upon terminals (e.g., the first and second terminals 60, 62) of the cell 44. Also, the hardness of the cured resin may relate to the crosslink density of the resin, which may also relate to the chemical stability of the resin. By way of non-limiting example, the cured resin may have a Shore D hardness (i.e., a hardness measured according to ASTM D2240, otherwise referred to as a hardness on the Shore D scale) of between approximately 40 and approximately 80, such as between approximately 45 and approximately 75, or between approximately 50 and approximately 70.

As set forth above, the cured resin may contact several electrically conductive components and, accordingly, may have a desired degree of electrical insulation. One such measure is the dielectric withstand voltage of the cured resin (the secondary seal 82), which denotes the effectiveness of the resin's electrical insulation, and may be measured according to MIL-I-46058C. The dielectric withstand voltage may be considered to represent a voltage at which the particular material is not a sufficient dielectric material (e.g., is not sufficient to block current from flowing between conductive elements). In some embodiments, the dielectric withstand voltage of the cured resin may be at least 100 Volts (V), at least 500 V, at least 1000 V, at least 1500 V, at least 2000 V, or higher. By way of further example, the dielectric withstand voltage of the cured resin (the secondary seal 82) may be between 100V and 5000V, such as between 1000V and 4000V, or between 2000V and 4000V.

The illustrated embodiment of FIG. 7 may also be considered to represent the formation of a secondarily sealed lithium ion battery cell. More specifically, the lithium ion battery cell 44 depicted using reference numeral 44a in FIG. 7 may be considered to represent a lithium ion battery cell 44 having a sealed terminal region. A process for producing a secondarily sealed lithium ion battery cell (depicted using reference numeral 44b in FIG. 7) from the battery cell 44a may include, by way of example, disposing the secondary sealant (including a curable adhesive resin) on the sealed terminal region 78 such that the secondary sealant covers the second portion 98 of the terminal post 76 (generally, a first portion of an electrical contact) of the terminal region 78 and the primary seal 92 (generally, a first seal disposed against a second portion of the electrical contact). The process may further include curing the curable adhesive resin to form the secondary seal 82 that covers the second portion 98 of the terminal post 76 (generally, the first portion of the electrical contact) and the primary seal 92 (generally, the first seal disposed against the second portion of the electrical contact). The resin may then be cured using, for example, UV light, or heat, or a chemical curing agent, or any combination thereof.

Figure 8:
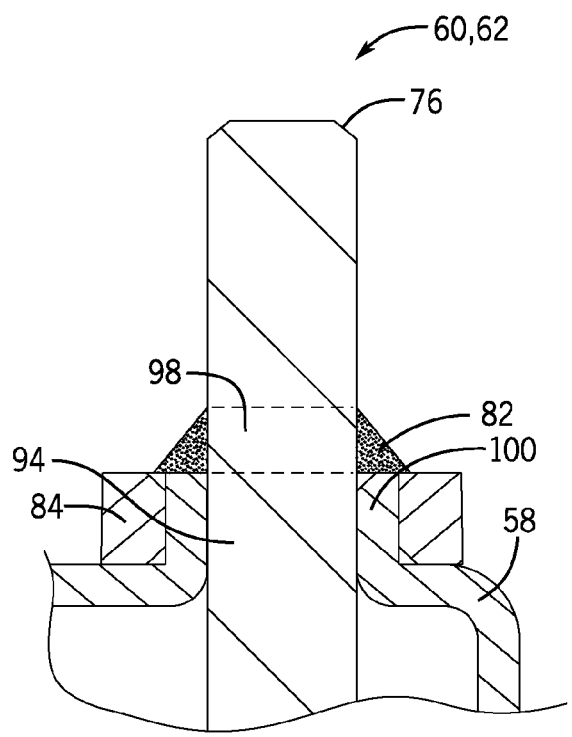
FIG. 8 is an expanded view of FIG. 6, taken within section 7-7 and illustrating another embodiment of various seals disposed at a terminal region of an embodiment of the battery cell of FIG. 4 having a polymeric casing, in accordance with an embodiment of the present approach.
Figure 9:
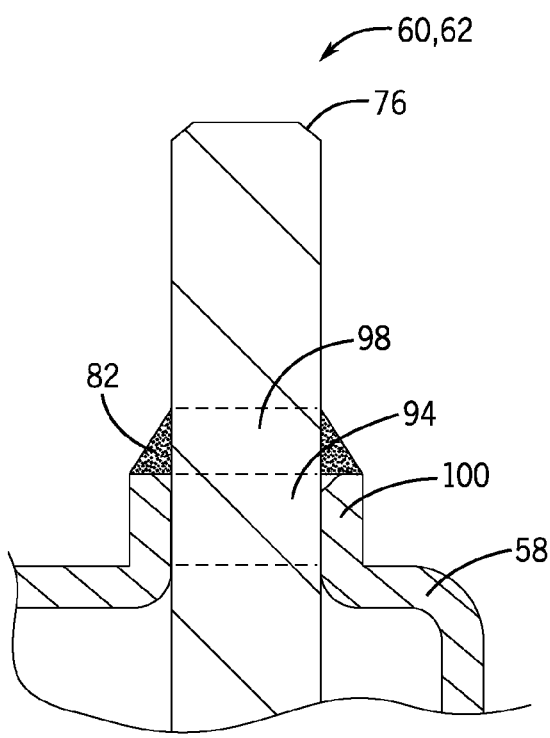
FIG. 9 is an expanded view of FIG. 6, taken within section 7-7 and illustrating another embodiment of various seals disposed at a terminal region of an embodiment of the battery cell of FIG. 4 having a polymeric casing, in accordance with an embodiment of the present approach.

As shown in FIGS. 8 and 9, which are similar cross-sectional views as set forth above with respect to FIG. 7, the battery cell 44 may include a polymeric version of the casing 58, which includes a collar 100 that acts as a combination of both the cylindrical extension 80 and the primary seal 92. Indeed, the collar 100, being made of the polymeric material of the casing 58, may be sized such that when the terminal post 76 is slid through the annulus of the collar 100, the collar 100 provides a compressive force by virtue of its ability to act as a living spring. In this way, the collar 100 of FIGS. 8 and 9 acts as a primary seal (primary sealing component) that is compressed against the first portion 94 of the terminal post 76 (electrical contact).

As shown in FIG. 8, such an embodiment may include the compressive seal 84. However, as shown in FIG. 9, certain embodiments of the terminal 60, 62 may not utilize the compressive seal 84, since the collar 100 may provide sufficient compression against the terminal post 76. The secondary sealant 82 may have similar positional relationships with the collar 100 to those set forth above with respect to the primary seal 92. That is, the secondary seal 82 may be disposed above, around, and/or proximate to the collar 100 to enable the secondary seal 82 to act as a primary feature to block the ingress of contaminant materials (e.g., water) and as a secondary feature to block the egress of electrolyte or similar materials out of the battery cell 44.

EXAMPLES

In accordance with the disclosed embodiments, various experiments were conducted to determine the effectiveness of the secondary seal 82 for preventing the loss of electrolyte from battery cells. According to the test procedure, several prismatic battery cells were obtained, including control samples with no leakage, as well as samples having leakage ranging from fine leakage to gross leakage of electrolytes. The groupings of the cells are provided in Table 1 below, along with the relative amount of known leakage from the cell terminals.

TABLE 1

| Cell Groupings | | |
| --- | --- | --- |
| Group | Quantity | Terminal Leak Level (Before Resin) |
| A | 3 | None |
| B | 3 | None |
| C | 2 | Gross |
| D | 3 | Fine |
| E | 2 | Gross |
| F | 3 | Fine |

Figure 10D:
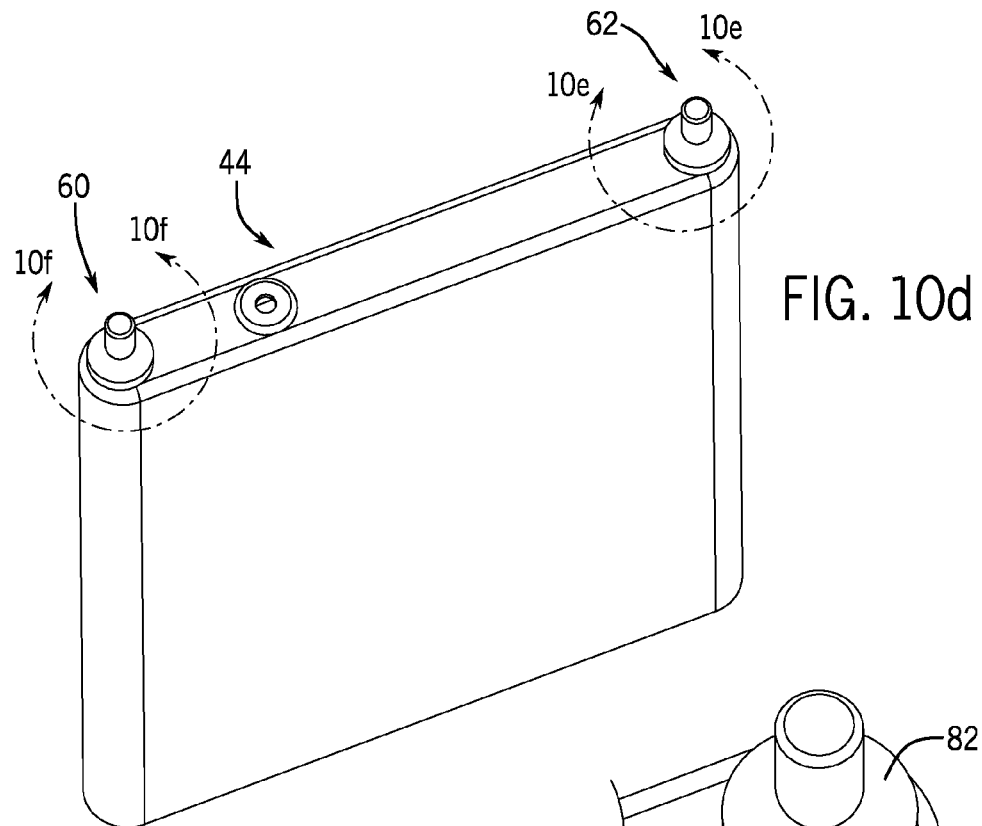
FIG. 10d is a perspective view of a battery cell after introduction of a secondary seal, in accordance with an embodiment of the present approach.
Figure 10F:
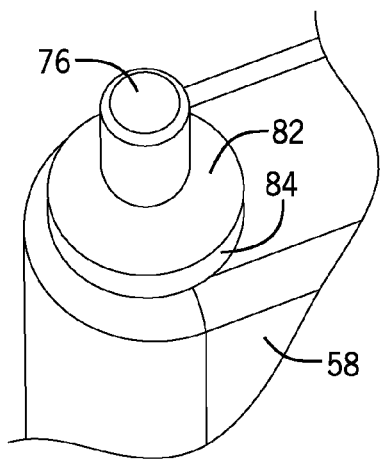
FIG. 10f is an expanded view of another one of the double-sealed terminals of the battery cell of FIG. 10d, in accordance with an embodiment of the present approach.
Figure 10E:
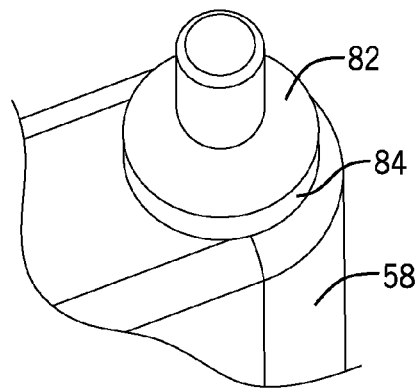
FIG. 10e is an expanded view of one of the double-sealed terminals of the battery cell of FIG. 10d, in accordance with an embodiment of the present approach.

Cell groups C, D, E, and F were then sealed using a secondary sealant applied above the compressive seal 84, primary seal 92, and the cylindrical extension 80, as shown in FIGS. 10a-10f. Specifically, FIGS. 10a and 10d illustrate the battery cell 44a and 44b, respectively where the secondary sealant has been applied between the two. FIGS. 10b and 10c illustrate expanded views of the first and second terminals of the battery cell 44a (without the secondary seal 82), while FIGS. 10e and 10f illustrate expanded views of the first and second terminals of the battery cell 44b with the secondary seal 82.

Figure 11:
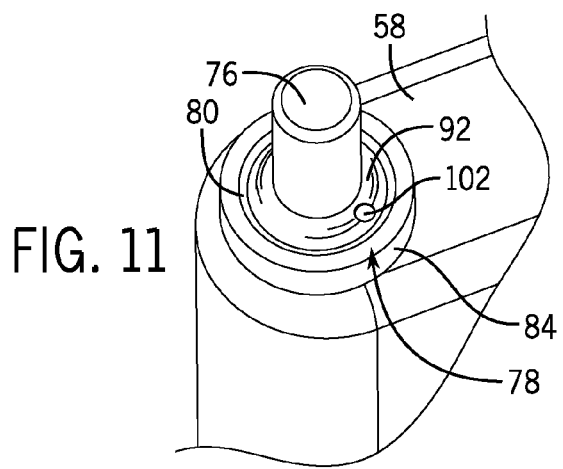
FIG. 11 is a perspective view of a terminal of an embodiment of the battery cell of FIG. 4, the terminal having a hole drilled into a primary seal to encourage leakage for testing, in accordance with an embodiment of the present approach.

In the context of the study, Groups C and D were sealed using OPTIX® UV curable epoxy resin and Groups E and F were sealed using SPEEDMASK® 729 UV curable acrylated urethane resin. For each cell of Group E, a 1.0 mm hole 102 was drilled though the primary seal 92 to simulate a leakage situation beyond what would normally occur during operation, as shown in FIG. 11.

Upon application of the secondary sealant and curing thereof to form the secondary seal 82, the leakage of the battery cells 44 was monitored over several days, during which time the cells 44 were stored in a vacuum chamber upside down (terminals down). Specifically, the battery cells 44 were tested for leakage just after sealing using a mass extraction leak test device available from Advanced Test Concepts, Inc. of Indianapolis, Ind., USA (hereinafter referred to as the "ATC device"), and were subsequently monitored by weighing the cells. Helium leak test results, where the leakage of helium out of the sealed cells was determined just after sealing, are provided in Table 2 below. Specifically, the results shown are pass/fail results, with a "PASS" given if the leakage of helium out of the sealed cells was determined to be below a threshold.

TABLE 2

Helium Leak Test Results

| Group | Sample | Helium Leak Test (P/F) |
|---|---|---|
| A | 1 | PASS |
|   | 2 | PASS |
|   | 3 | PASS |
| B | 1 | PASS |
|   | 2 | PASS |
|   | 3 | PASS |
| C | 1 | PASS |
|   | 2 | PASS |
| D | 1 | PASS |
|   | 2 | PASS |
|   | 3 | PASS |
| E | 1 | PASS |
|   | 2 | PASS |
| F | 1 | PASS |
|   | 2 | PASS |
|   | 3 | PASS |

Values obtained from the ATC device were then collected throughout a period of seven days of vacuum storage. Those values are set forth in Table 3 below.

TABLE 3

Leak Test Results Throughout Storage

ATC Leak Test Value (µg/min)

| Group | Sample | Day 0 | Day 1 | Day 2 | Day 6 | Day 7 |
|---|---|---|---|---|---|---|
| A | 1 | 0.026 | −0.030 | 0.000 | −0.018 | −0.011 |
|   | 2 | 0.009 | −0.050 | −0.024 | −0.012 | −0.053 |
|   | 3 | 0.992 | −0.059 | 0.048 | −0.022 | −0.052 |
| B | 1 | 0.014 | −0.064 | −0.045 | −0.013 | −0.047 |
|   | 2 | 0.008 | −0.067 | −0.060 | −0.020 | −0.010 |
|   | 3 | −0.014 | −0.071 | −0.055 | 0.094 | 0.006 |
| C | 1 | 0.154 | −0.060 | −0.038 | −0.003 | −0.063 |
|   | 2 | 0.074 | −0.065 | −0.049 | −0.027 | −0.060 |
| D | 1 | −0.002 | 0.048 | −0.051 | −0.035 | −0.036 |
|   | 2 | 0.117 | −0.071 | −0.058 | −0.042 | −0.005 |
|   | 3 | 0.072 | −0.069 | −0.042 | −0.021 | −0.037 |
| E | 1 | 0.172 | −0.074 | −0.045 | −0.018 | −0.064 |
|   | 2 | 0.092 | −0.072 | −0.044 | −0.014 | 0.014 |
| F | 1 | 0.802 | −0.018 | −0.049 | −0.029 | −0.020 |
|   | 2 | 0.116 | −0.070 | −0.025 | −0.028 | −0.037 |
|   | 3 | 0.080 | −0.073 | −0.046 | −0.034 | −0.028 |

Figure 12:
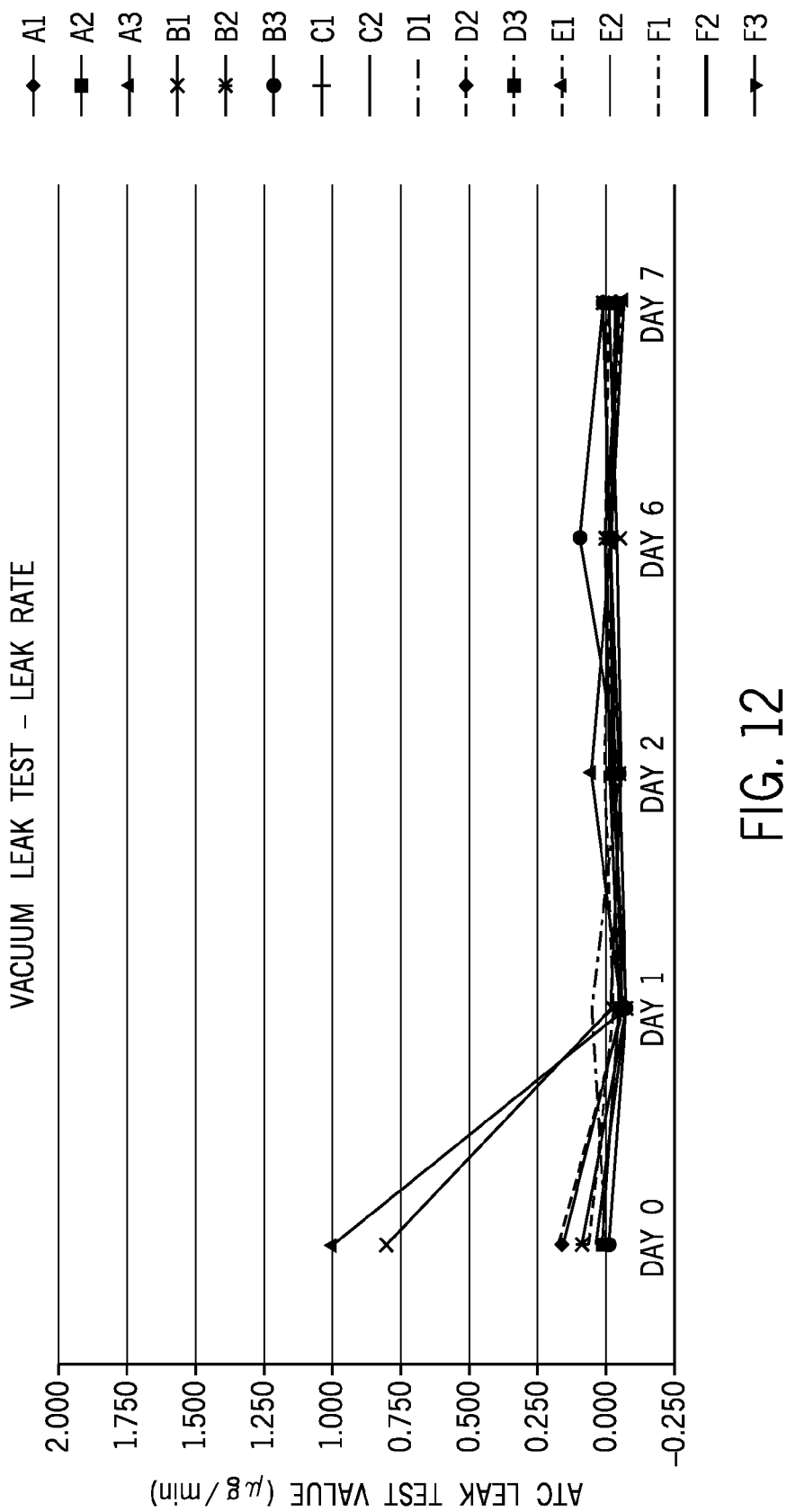
FIG. 12 is a graphical depiction of leak rate obtained from testing various battery cells sealed with a secondary sealant in accordance with an embodiment of the present approach.
Figure 13:
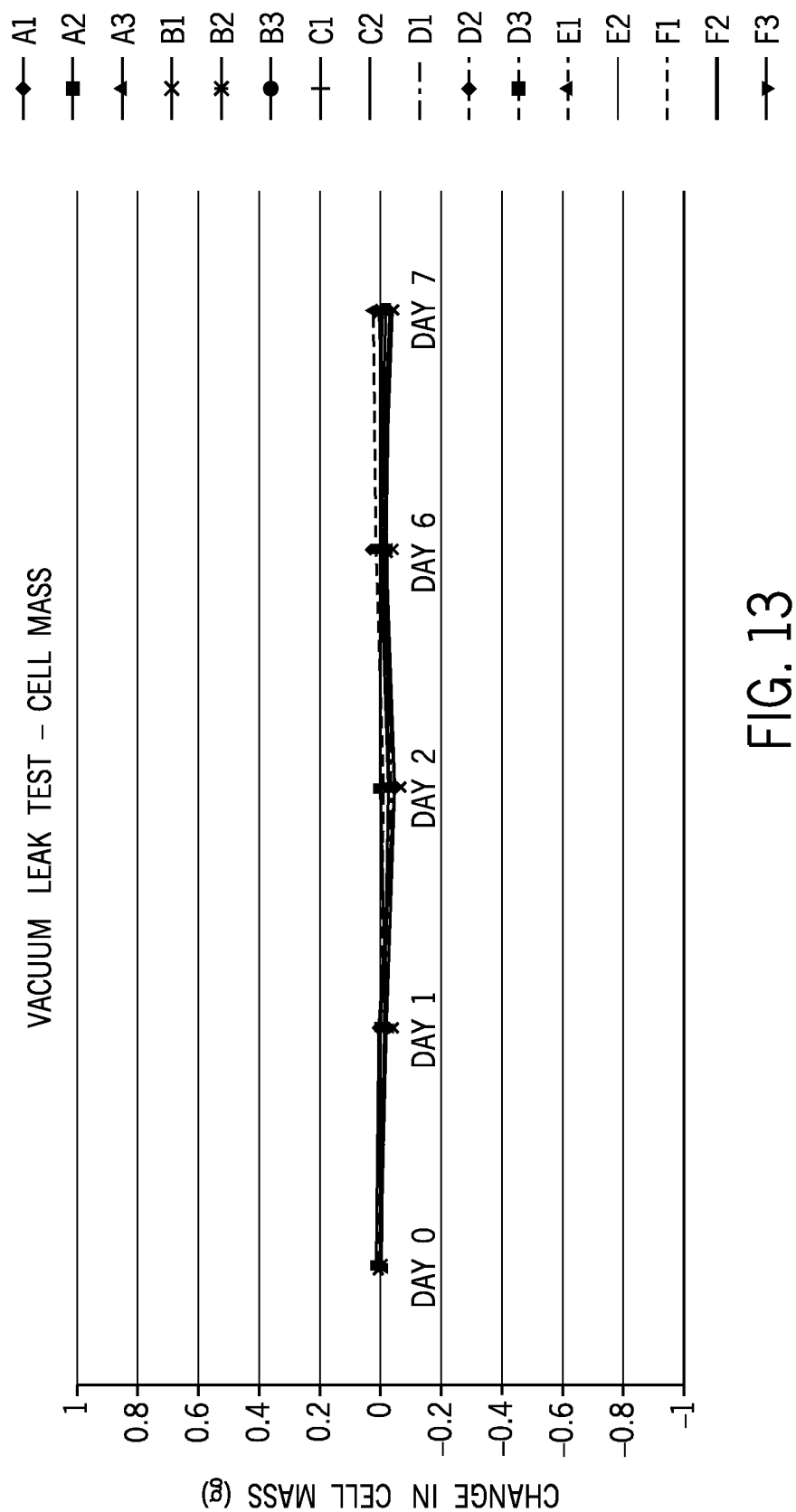
FIG. 13 is a graphical depiction of leak rate obtained from testing various battery cells sealed with a secondary sealant in accordance with an embodiment of the present approach.

The cells 44 were also removed from the vacuum chamber and weighed periodically. The weights of the cells 44 are provided in Table 4 below. The results set forth in Tables 3 and 4 are depicted graphically in FIGS. 12 and 13, respectively.

TABLE 4

Cell masses values collected throughout vacuum storage

Weight (g)

| Group | Sample | Day 0 | Day 1 | Day 2 | Day 6 | Day 7 |
|---|---|---|---|---|---|---|
| A | 1 | 230.44 | 230.44 | 230.41 | 230.45 | 230.43 |
|   | 2 | 229.55 | 229.55 | 229.55 | 229.55 | 229.55 |
|   | 3 | 230.14 | 230.14 | 230.14 | 230.14 | 230.14 |

TABLE 4-continued

Cell masses values collected throughout vacuum storage

Weight (g)

| Group | Sample | Day 0 | Day 1 | Day 2 | Day 6 | Day 7 |
|---|---|---|---|---|---|---|
| B | 1 | 230.23 | 230.20 | 230.17 | 230.20 | 230.18 |
|   | 2 | 230.40 | 230.40 | 230.37 | 230.40 | 230.36 |
|   | 3 | 228.22 | 228.22 | 228.19 | 228.19 | 228.20 |
| C | 1 | 228.66 | 228.66 | 228.66 | 228.66 | 228.68 |
|   | 2 | 230.00 | 229.99 | 229.99 | 229.99 | 229.99 |
| D | 1 | 229.09 | 229.09 | 229.09 | 229.09 | 229.09 |
|   | 2 | 229.61 | 229.60 | 229.61 | 229.60 | 229.60 |
|   | 3 | 229.76 | 229.74 | 229.73 | 229.74 | 229.74 |
| E | 1 | 229.93 | 229.92 | 229.91 | 229.93 | 229.92 |
|   | 2 | 230.35 | 230.35 | 230.36 | 230.36 | 230.35 |
| F | 1 | 228.81 | 228.78 | 228.77 | 228.78 | 228.77 |
|   | 2 | 229.51 | 229.51 | 229.50 | 229.54 | 229.52 |
|   | 3 | 229.54 | 229.54 | 229.54 | 229.55 | 229.54 |

As can be seen from the tabulated and graphically depicted data, cell leakage was entirely mitigated for the battery cells 44 having known and significant leakage. Accordingly, it is believed that the presently disclosed embodiments of battery cells incorporating the secondary seal 82 disclosed herein may be useful for increasing the yield of usable battery cells during battery cell manufacturing (e.g., by decreasing or eliminating the production of leaky battery cells). Indeed, it is believed that the presently disclosed embodiments may provide a 100% useful battery cell yield.

One or more of the disclosed embodiments, alone or on combination, may provide one or more technical effects useful in the manufacture of battery modules, and portions of battery modules. For example, certain embodiments of the present approach may enable the manufacture of lithium ion battery cells having a secondary seal that enables enhanced retention of electrolyte within the cell and prevention of water ingress into the interior of the cell. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
 a lithium ion battery cell disposed within a housing of the battery module, the lithium ion battery cell comprising:
  a casing enclosing active components of the lithium ion battery cell, the active components comprising an electrolyte and an electrode assembly in contact with the electrolyte, wherein the casing comprises a protrusion disposed at a top of the casing and the protrusion defines an opening in the casing;
  a terminal electrically connected to the electrode assembly, wherein the terminal comprises an electrical contact extending through the opening in the casing, and wherein the protrusion of the casing comprises a cylindrical extension defining an annular region that is substantially co-axial with the electrical contact;

a primary sealing component disposed against the electrical contact to seal the electrical contact against the casing;

a secondary seal disposed around the electrical contact and against the primary sealing component, wherein the secondary seal is formed from a curable adhesive resin and is configured to resist egress of the electrolyte out of the lithium ion battery cell; and a compressive seal disposed around the cylindrical extension and a first portion of the electrical contact, and wherein the secondary seal is disposed against the primary sealing component and around a second portion of the electrical contact, the second portion being further away from the active components of the lithium ion battery cell than the first portion.

2. The battery module of claim 1, wherein the compressive seal provides a compressive force such that the cylindrical extension is urged inwardly toward the electrical contact.

3. The battery module of claim 1, wherein the secondary seal is disposed against the compressive seal such that the compressive seal is positioned between the secondary seal and a top of the lithium ion battery cell.

4. The battery module of claim 1, wherein the primary sealing component comprises a polymeric primary seal disposed within the opening and between the protrusion and the electrical contact, and the casing and the protrusion are metal.

5. The battery module of claim 1, wherein the casing is polymeric and the primary sealing component comprises the protrusion, and the protrusion is in direct contact with the electrical contact.

6. The battery module of claim 1, wherein the secondary seal is formed from a secondary sealant comprising a UV curable epoxy resin or a UV curable acrylated urethane resin.

7. The battery module of claim 1, wherein the secondary seal has a dielectric withstand voltage sufficient to cause the secondary seal to act as a dielectric material at operating voltages of the battery module.

8. The battery module of claim 7, wherein the dielectric withstand voltage of the secondary seal is between 1000 Volts (V) and 4000V.

9. The battery module of claim 1, wherein the secondary seal comprises a pigment configured to optically contrast the secondary seal against other components of the lithium ion battery cell.

10. The battery module of claim 1, wherein the secondary seal has a hardness on the Shore D scale of between 40 and 80.

11. The battery module of claim 1, wherein the secondary seal is configured to resist ingress of moisture into the lithium ion battery cell.

12. A lithium ion battery cell, comprising:
a prismatic casing enclosing active components of the lithium ion battery cell, the active components comprising an electrolyte and an electrode assembly in contact with the electrolyte;

a terminal comprising a terminal post extending through an opening in the casing, wherein the terminal post is electrically connected to the electrode assembly;

a primary sealing component configured to seal a first portion of the terminal post against the casing; and a secondary seal disposed around a second portion of the terminal post and the primary sealing component, wherein the first portion of the terminal post is closer to the active components than the second portion, and the secondary seal is formed from a curable adhesive resin and is configured to resist egress of the electrolyte out of the lithium ion battery cell and is configured to resist ingress of moisture into the lithium ion battery cell, and wherein the secondary seal comprises a pigment configured to optically contrast the secondary seal against other components of the lithium ion battery cell.

13. The lithium ion battery cell of claim 12, wherein the prismatic casing is metallic, the prismatic casing comprises a cylindrical extension that is substantially parallel with the terminal post, the cylindrical extension defines an annular region corresponding to the opening, and the primary sealing component comprises insulating polymeric primary seal disposed between the first portion of the terminal post and the cylindrical extension, the insulating seal being configured to electrically insulate the cylindrical extension from the terminal post.

14. The lithium ion battery cell of claim 12, wherein the prismatic casing is polymeric, the prismatic casing comprises a cylindrical extension that is substantially parallel with the terminal post, the cylindrical extension defines an annular region corresponding to the opening, and the primary sealing component comprises the cylindrical extension.

15. The lithium ion battery cell of claim 12, wherein the primary sealing component comprises:
a primary seal disposed within the opening and between the casing and the terminal post to electrically insulate the terminal post from the casing; and a compressive seal disposed around the primary seal and the first portion of the terminal post, wherein the compressive seal is configured to compress the primary seal around the terminal post; and wherein the secondary seal extends radially away from the second portion of the terminal post and to the compressive seal such that the compressive seal and the secondary seal are in an overlapping relationship in a longitudinal direction of the lithium ion battery cell.

16. The lithium ion battery cell of claim 12, wherein the secondary seal has a dielectric withstand voltage of between 1000 Volts (V) and 5000 V, and the secondary seal has a hardness on the Shore D scale of between 40 and 80.

17. The lithium ion battery cell of claim 12, wherein the secondary seal is formed from a UV-curable adhesive resin.

18. The lithium ion battery cell of claim 17, wherein the UV-curable adhesive resin comprises a UV-curable epoxy resin.

19. The lithium ion battery cell of claim 17, wherein the UV-curable adhesive resin comprises a UV-curable acrylated urethane resin.

20. A double-sealed lithium ion battery cell, wherein the double-sealed lithium ion battery cell is produced by a process comprising:
disposing a secondary sealant comprising a curable adhesive resin on a sealed terminal region of a prismatic lithium ion battery cell such that the secondary sealant covers a first portion of an electrical contact of the terminal region and a primary sealing component is disposed against a second portion of the electrical contact, wherein the second portion is further away from active components of the double-sealed lithium ion battery cell than the first portion; and curing the curable adhesive resin to form a secondary seal that covers the first portion of the electrical contact and the primary sealing component.

21. The double-sealed lithium ion battery cell of claim 20, wherein curing the curable adhesive resin comprises irradiating the secondary sealant with UV light.

22. The double-sealed lithium ion battery cell of claim 20, wherein disposing the secondary sealant on the sealed terminal region comprises disposing a UV curable epoxy resin or a UV curable acrylated urethane resin on the sealed terminal region.

23. The double-sealed lithium ion battery cell of claim 20, wherein the secondary sealant has a viscosity between 1000 centiPoise and 4000 centiPoise.

* * * * *